Patented Apr. 29, 1947

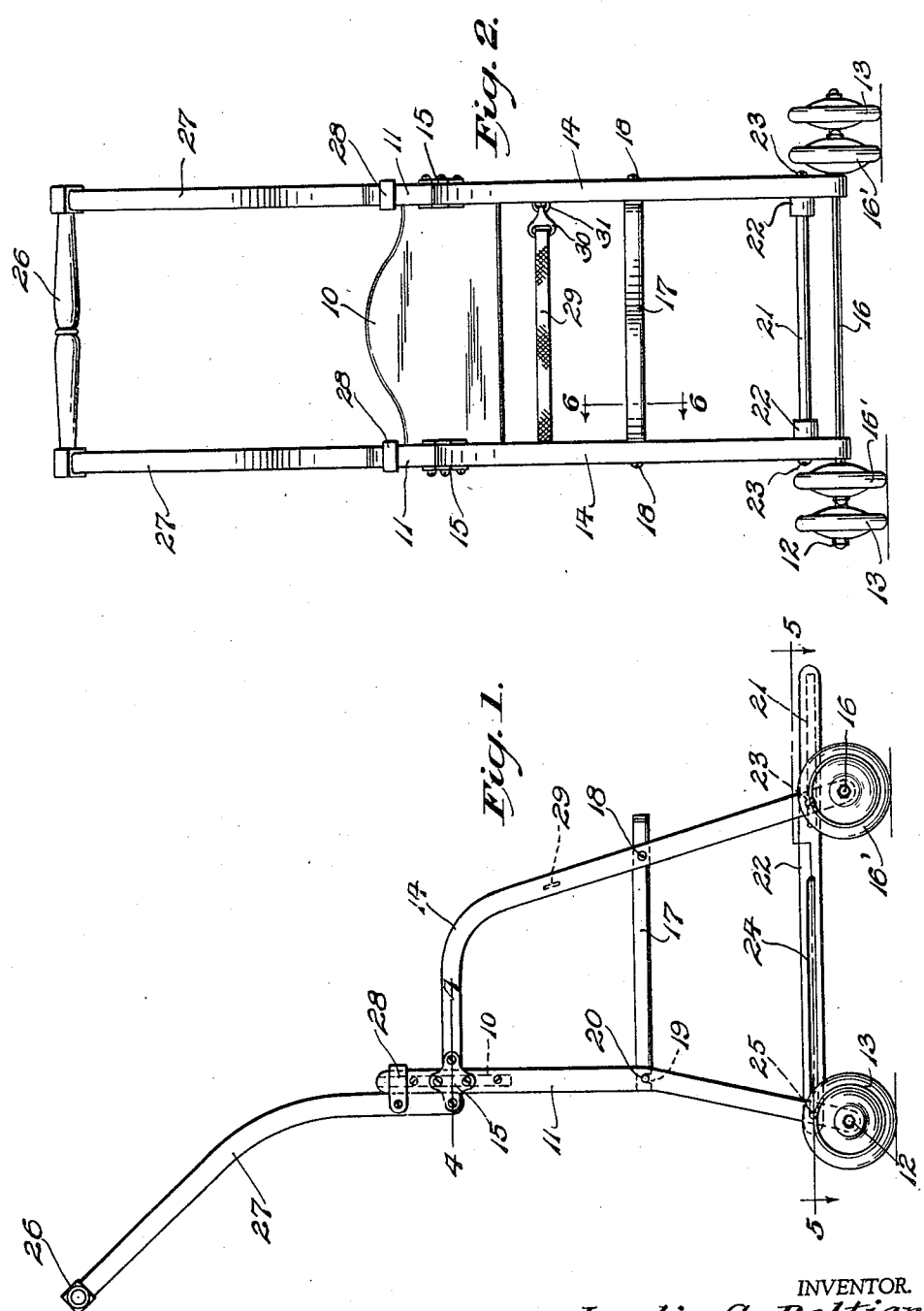

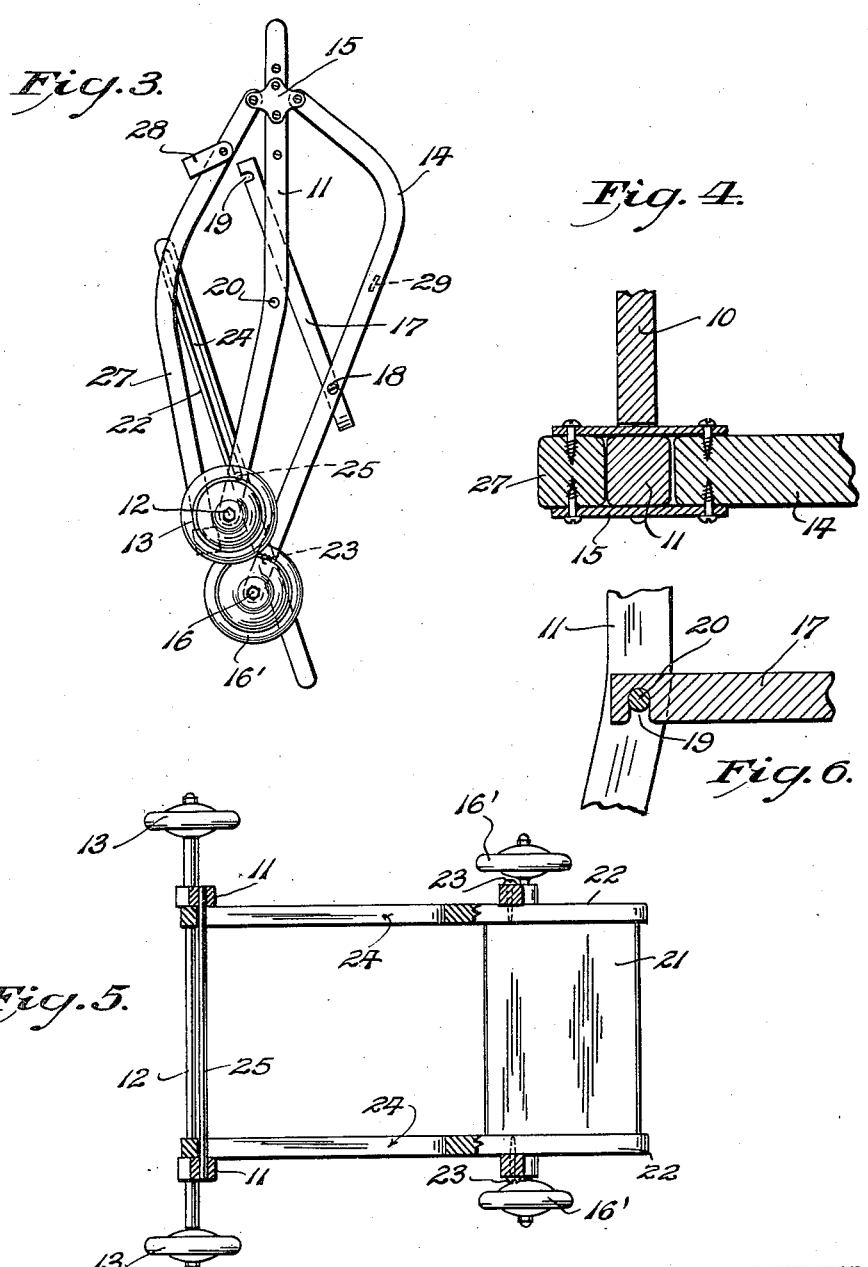

2,419,790

UNITED STATES PATENT OFFICE 2,419,790

COLLAPSIBLE STROLLER VEHICLE

Leslie C. Peltier, Delphos, Ohio, assignor to The Delphos Bending Company, Delphos, Ohio, a corporation of Ohio Application February 13, 1946, Serial No. 647,294

4 Claims. (Cl. 280—41)

My invention relates to stroller vehicles for children and particularly to collapsible vehicles of this character.

The present types of baby strollers provide ample means transporting a child by a walker; however, there is a great need for a vehicle of this type that is compact and of light enough weight to permit of easy storage and portability.

It is therefore an object of my invention to provide a child's stroller which is collapsible, and which, when in a collapsed state, is compact and of relatively small size so as to permit of carrying by a person, or of being stored compactly within a relatively small space, such as an automobile compartment.

It is another object of my invention to provide a child's stroller vehicle which includes positive locking means, as applied to its collapsibility, when the stroller is in an operating condition.

For a further understanding of my invention, reference is made to the following description and accompanying drawings, wherein:

Fig. 1 is a side elevational view of my improved collapsible stroller vehicle in an operating condition;

Fig. 2 is a front elevational view disclosing the same;

Fig. 3 is a side elevational view of the stroller in a collapsed or folded condition;

Fig. 4 is a horizontal sectional view taken along the line 4—4 of Fig. 1, disclosing the hinge bracket;

Fig. 5 is a horizontal sectional view along the line 5—5 of Fig. 1;

Fig. 6 is a vertical sectional view taken along the line 6—6 of Fig. 2.

My collapsible stroller vehicle includes a back board 10 supported between a pair of angularly bent side members 11. The side members 11 are supported substantially at their lower ends by a rear axle 12 having wheels 13 at its ends. Angularly bent arm rests 14 are hinged to the side members by means of double hinge plates 15 rigidly fastened to the upper portion of the side members, said arm rests extending downwardly to receive a front axle 16 having wheels 16', at their lower ends. A horizontal seat member 17 is pivotally supported at its forward portion between the arm rests 14 by pins 18.

An open groove 19 is formed at the rear portion of the seat member and is designed for detachable engagement with a central rung 20 disposed between the side members 11. A horizontal foot platform 21 having a pair of backwardly extending supporting members 22 is pivotally mounted between the lower portions of the arm rests 14 by pins 23. The supporting members 22 include horizontal slots 24 which freely receive therein a lower rung 25 disposed between the side members 11 at their lower portions.

A pushing handle comprising a gripping element 26 and a pair of angularly bent arms 27 is hinged to the upper portion of the side members opposite the arm rests by means of the hinge plate 15. A pair of bales 28 are pivotally connected with the lower portions of the arms 27 and are adapted for engagement with the upper ends of the side members 11, and when thus engaged, serve to rigidly hold the pushing handle to the side members.

When the stroller is in the operating or unfolded position, as shown in Figs. 1 and 2 of the drawings, the arm rests and side members are swung apart until the groove 19 engages the central rung 20. It will be manifest that the weight of a child, sitting upon the seat member 17, will maintain this engagement. The pushing handle is secured to the side members by the bales 28, thus forming a rigid chair-like vehicle.

To collapse or fold the stroller, as shown in Fig. 3 of the drawings, the bales 28 are lifted from the upper ends of the side members 11 and the pushing handle is swung downwardly against the rear axle 12. The seat member 17 is then raised to disengage the groove 19 from the central rung 20 and the side members 11 and arm rests 14 are pushed together until the lower rung 25 reaches the forward ends of the slots 24 of the platform member. Thus the stroller is maintained in a compact folded state which may be easily carried or transported in an automobile.

A safety belt 29 is provided between the side members 14 and has a detachable clip 30 at one end which engages a circular eye 31 in one of the side members 14 and serves to hold a child within the stroller.

Consideration will disclose that the present invention provides a structurally simple child's stroller which may be readily collapsed into a compact body, when not in use, for storage and shipment purposes. Similarly, the stroller may be conveniently extended to assume its active or operative form. In such collapsing and extending operations, the stroller involves but few parts, permanently carried thereby, which need to be manually actuated. Another advantage of the structure resides in its moderate cost of manufacture.

I claim:

1. A child's stroller vehicle comprising a frame composed of a pair of rear vertically extending side members, hinge plates secured to the upper portion of said side members, a pair of forward side members carried at their upper ends to provide arm rests, means pivotally uniting the rear ends of said arm rest portions of the forward members with said hinge plates, a U-shaped pusher handle having its lower ends pivotally connected with said hinge plates in the horizontal plane of the arm rests, pivoted latch bales carried by said pusher handle and engageable with the upper ends of said rear side members above the upper portion of said hinge plates to retain the handle in fixed relation with said frame, a seat pivotally connected at its forward portion with said front side members, said seat having removable engagement with the rear side members, and wheeled axles carried by the lower ends of said rear and front side members.

2. A child's stroller vehicle comprising a frame composed of a pair of rear vertically extending side members, hinge plates secured to the upper portion of said side members, a pair of forward side members curved at their upper ends to provide arm rests, means pivotally uniting the rear ends of said arm rest portions of the forward members with said hinge plates, a handle structure pivotally connected with the hinge plates, a seat pivotally connected at its forward portion with said front side members, said seat having removable engagement with the rear side members, and wheeled axles carried by the lower ends of said rear and front side members.

3. A child's stroller vehicle comprising a frame composed of a pair of rear vertically extending side members, hinge plates secured to the upper portion of said side members, a pair of forward side members curved at their upper ends to provide arm rests, means pivotally uniting the rear ends of said arm rest portions of the forward members with said hinge plates, a U-shaped pusher handle having its lower ends pivotally connected with said hinge plates in the horizontal plane of the arm rests, pivoted latch bales carried by said pusher handle and engageable with the upper ends of said rear side members above the upper portion of said hinge plates to retain the handle in fixed relation with said frame, a seat pivotally connected at its forward portion with said front side members, said seat having removable engagement with the rear side members, wheeled axles carried by the lower ends of said rear and front side members, and a foot platform embodying a pair of slotted side members pivotally united at their forward ends with the lower ends of said front side members, and a cross rung disposed between the lower ends of said rear side members above the wheeled axle and positioned in the slots of the side members of said platform.

4. A child's stroller vehicle comprising a frame composed of a pair of rear vertically extending side members, hinge plates secured to the upper portion of said side members, a pair of forward side members curved at their upper ends to provide arm rests, means pivotally uniting the rear ends of said arm rest portions of the forward members with said hinge plates, a U-shaped pusher handle having its lower ends pivotally connected with said hinge plates in the horizontal plane of the arm rests, pivoted latch bales carried by said pusher handle and engageable with the upper ends of said rear side members above the upper portion of said hinge plates to retain the handle in fixed relation with said frame, a seat pivotally connected at its forward portion with said front side members, a cross rung uniting the central portions of said rear side members and adapted to detachably receive the rear portion of said seat, and wheeled axles carried by the lower ends of said rear and front side members.

LESLIE C. PELTIER.